UNITED STATES PATENT OFFICE.

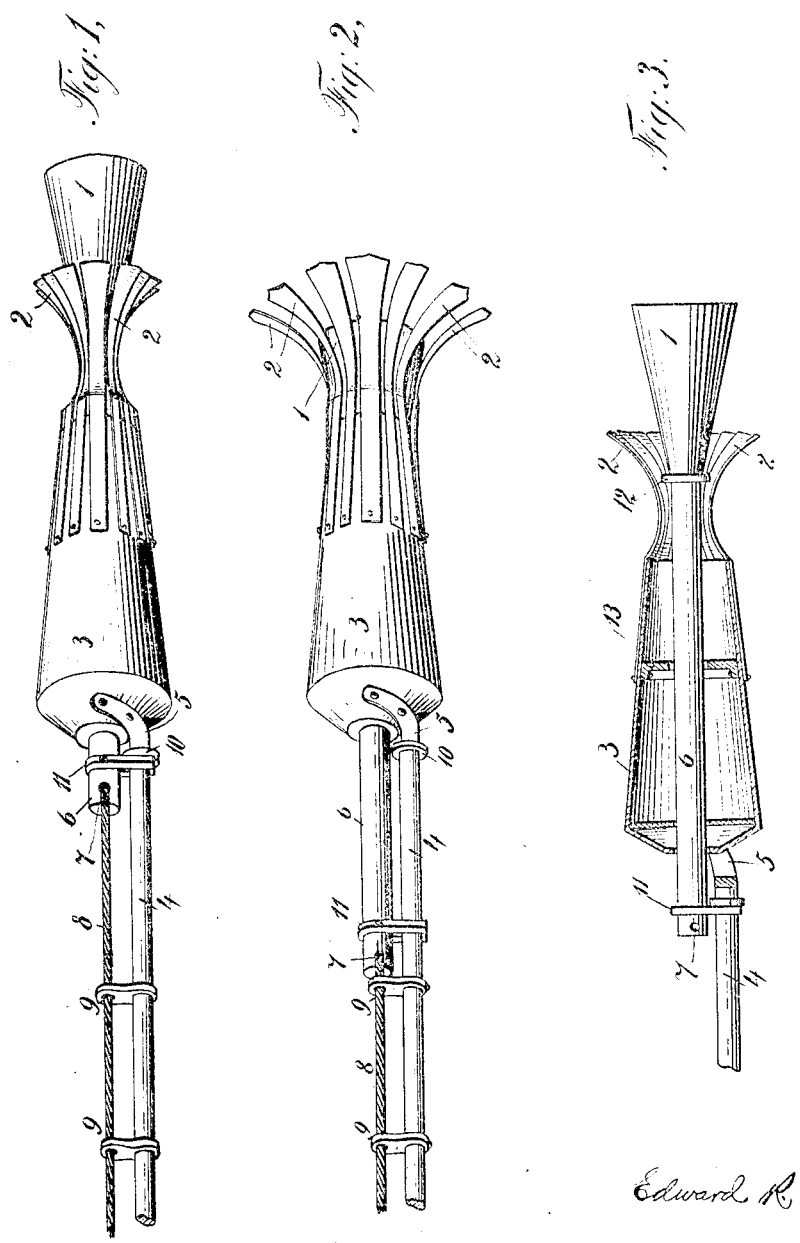

EDWARD R. REESER, OF TAMAQUA, PENNSYLVANIA, ASSIGNOR, BY MESNE ASSIGNMENTS, TO NATIONAL WATER MAIN CLEANING COMPANY, OF NEW YORK, N. Y., A CORPORATION OF MAINE.

PIPE-LINE CLEANER.

No. 906,560.　　　Specification of Letters Patent.　　　Patented Dec. 15, 1908.

Application filed November 12, 1903. Serial No. 180,873.

*To all whom it may concern:*

Be it known that I, EDWARD R. REESER, a citizen of the United States, and a resident of Tamaqua, in the county of Schuylkill and State of Pennsylvania, have invented a certain new and useful Improvement in Pipe-Line Cleaners, of which the following is a specification.

This invention relates to a device for cleaning pipe lines, as will be explained, reference being had to the accompanying drawing, in which—

Figure 1 is a perspective view of the device ready to be inserted into a pipe; Fig. 2 is a perspective view of the device after the spreading cone has been pulled down so as to expand the scrapers; Fig. 3 is a section of the spreading cone and the cone-shaped carrier of the scrapers, showing the shoulders on the spreading cone and on the stem of the spreading cone and on the cone shaped carrier which limits the inward and outward motions of the spreading cone.

In the drawing, 1 is a cone adapted to be moved inside of the scrapers 2 on the cone-shaped carrier 3. The scrapers 2 are preferably made of spring steel and are spread outwards when the cone 1 is pulled downwards so as to press upon the same. The cone-shaped carrier 3 is carried by a rod 4, fastened to a clevis 5 passing over the stem 6 of the cone 1. In place of the clevis 5, a hollow cylinder passing over the stem 6 may be used, serving the same purpose and being an obvious equivalent. On the stem 6 there is a loop 7, to which is attached a rope or cable 8, which passes along the rod 4 and which may pass through guiding loops 9 on the same. Shoulders 10 and 11 on the rod 4 and on the stem 6, limit the outward movement of the cone 1 and shoulders 12 and 13 on the cone 1 and on the interior of the carrier 3, limit the interior movement of the cone 1.

This device is more particularly intended to be used where an opening in the line of piping is available only at one end and when this opening is at a comparatively short distance, say 20 to 100 feet, from the main water pipe line.

In practice the device is used as follows: The cone is pushed outward until the lower portion of the clevis 5 is brought in contact with the shoulder 10 on the rod 4. In this position the extreme portions of the scrapers 2 lie in a circle having the least area, and thus it is then possible to push the cleaning device through a pipe line that has been considerably contracted in area through sediment and growths. After the scrapers have taken the required position, the cable 8 is pulled while the rod 4 is kept stationary until the scrapers 2 have been spread out as far as practicable. After this the cable 8 and rod 4 are both pulled together, whereby the scrapers also are moved, and loosen and remove obstructions in the pipe line. If desired, the cleaner may be passed through the same portion of the pipe line more than once, and water may also be simultaneously passed through the pipe line to flush the same and wash out matter that has been loosened by but not carried off by the cleaning device. It is evident that by this device a pipe may be cleaned for a considerable distance from both sides of an opening, if desired.

The scrapers 2 are preferably made with rather long stems and of spring steel, so as to readily be moved outward by the cone 1 and to resume their contracted position when clear of the cone.

What I claim as new is:

1. A device of the character described consisting of a spreading cone, means for moving the same, a series of scrapers circularly arranged and adapted to be spread outward when the spreading cone is pulled against the same, a carrier of the scrapers, means for moving the carrier, a stem attached to the spreading cone and shoulders on the stem and on the carrier to limit the movement of the spreading cone with relation to the carrier.

2. A device of the character described consisting of a spreading cone, a series of curved scrapers circularly arranged and adapted to be spread outward when the spreading cone is moved against the same, an inverted cone to which the scrapers are attached, a stem attached to the spreading cone and shoulders on the stem and on the inverted cone to limit the movement of the spreading cone with relation to the inverted cone.

Signed at New York in the county of New York and State of New York this 9th day of Nov. A. D. 1903.

EDWARD R. REESER.

Witnesses:
　C. A. O. ROSELL,
　F. G. WETTERAN.